May 3, 1938.   C. S. FLEMING   2,115,973
FILLER FOR GAS MASK CANISTERS
Filed Feb. 12, 1936

INVENTOR
CORNELIUS S. FLEMING
BY Charles S. Evans
HIS ATTORNEY

Patented May 3, 1938

2,115,973

UNITED STATES PATENT OFFICE 2,115,973

FILLER FOR GAS MASK CANISTERS

Cornelius S. Fleming, Berkeley, Calif., assignor to E. D. Bullard Company, San Francisco, Calif., a corporation of California Application February 12, 1936, Serial No. 63,634

17 Claims. (Cl. 252—2.5)

My invention relates to gas mask canisters, and particularly to improvements in fillers therefor for removing impurities from air to be breathed.

Among the objects of my invention is the provision of a gas mask canister filler which will operate efficiently for a long period of time as compared to the fillers heretofore known and used.

Another object is to provide a filler for gas mask canisters which may be kept for long periods of time, and which may be exposed to ordinary conditions of temperature and drying atmosphere without serious impairment of its operating efficiency.

A further object is to provide a filler for gas mask canisters in which the active reagent is maintained in a condition suited to the efficient removal of impurities from air to render it fit for breathing.

The invention possesses other objects and features of advantage, some of which, with the foregoing will be set forth in the following description of my invention. It is to be understood that I do not limit myself to this disclosure of species of my invention, as I may adopt variant embodiments thereof within the scope of the claims.

Referring to the drawing:—

Figure 1:
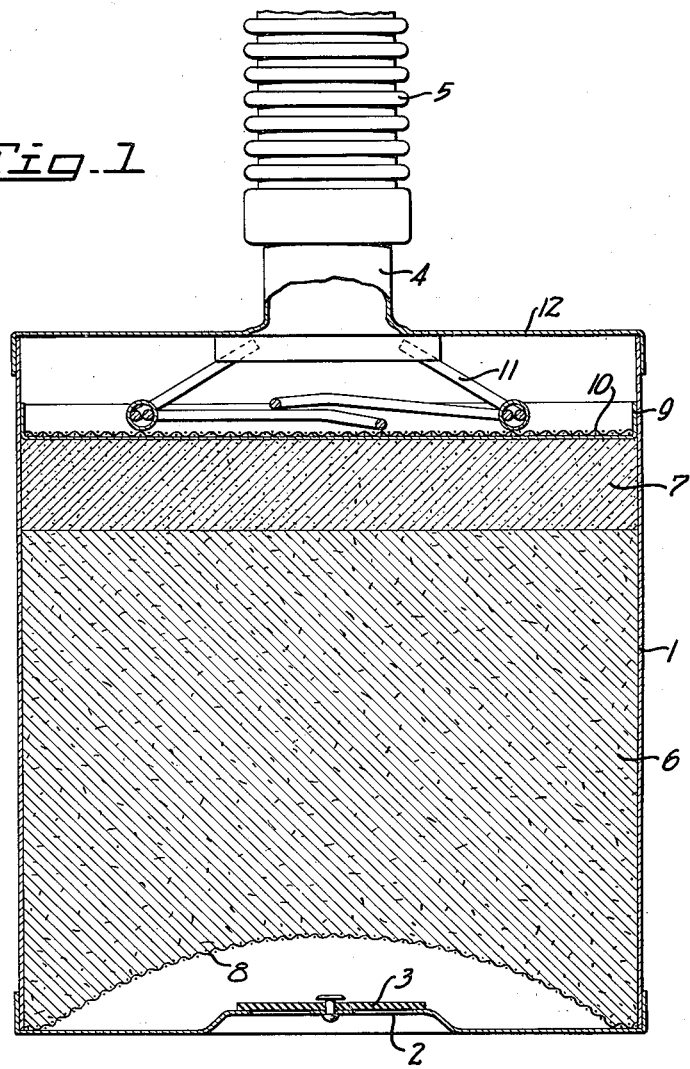
Figure 1 is a vertical section of a canister and filler embodying my invention.
Figure 2:
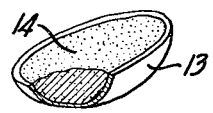
Figure 2 is a greatly magnified view of a particle of the preferred filler material.

In terms of broad inclusion, the canister and filler of my invention comprises a container having air inlet and outlet openings through which air may be drawn for breathing. Within the canister is placed a filler comprising a light, porous mass of absorbent material which is wet with a liquid chemical reagent, preferably a solution of a chemical compound, adapted to react with an impurity in air drawn through the canister for removing the impurity for purifying the air for breathing. To retard the evaporation of the solvent for the active reagent, a substance, preferably an organic liquid soluble in the solvent and having a high boiling point and low vapor pressure, is incorporated into the filler. A layer of charcoal is preferably, but not necessarily, applied over the active filler for absorbing odors that may be given off by the filler.

In terms of greater detail, the canister of my invention comprises the usual container 1 having an air inlet 2 provided with a suitable check valve 3, and an outlet 4 arranged to be connected to the air supply hose 5 of a gas mask.

Within the container 1 is placed a layer 6 of material suitable for removing impurities, such as ammonia or other harmful or obnoxious gases, from air passed through the canister. The filler comprises a body of light, porous, absorbent material which serves as a carrier for absorbing and holding a substantial quantity of a reagent capable of reaction with whatever impurity is to be removed from the air.

As the porous absorbent carrier for the active reagent, I prefer to use a material comprising the hulls of rice, or other grains, or other small resilient cup-like bodies, having a wet paste-like filling deposited within the cup-like recesses of the hulls and containing the active reagent. Such a carrier may be prepared as follows:

A desired quantity of rice hulls is placed in a container with appropriate amounts of a pulverulent material and the desired chemical reagent, or a solution thereof, and the mixture agitated until the hulls and pulverulent material are thoroughly wetted. The pulverulent absorbent material absorbs the liquid reagent and forms a wet mud-like paste. As a pulverulent material, rice hull ash is preferred; but other light powdery material such as infusorial earth, or any organic or inorganic powder capable of absorbing and retaining the desired chemical reagent without reaction therewith, may be used.

The mixture is agitated, preferably by rolling the mixture in a drum, until the paste is distributed uniformly throughout the wet mass of hulls. The rolling treatment causes the wet paste to collect in the hollow cup-like recesses of the hulls.

The rice hulls contain a high percentage of siliceous material, and are of a nature and texture such that they do not tend to become soggy and mat down when exposed to moisture. Moreover the shape and natural resilience of the hulls is such that the hulls will sustain a substantial amount of pressure without crushing. In mass, each hull resiliently resists displacement or crushing by its neighbors, and when lightly pressed into a canister, each hull presses against the adjacent hulls in such manner as to maintain a permanently porous body and prevent the formation of low resistance air channels. Air passing through the mass is exposed to direct contact with the wet filling in the hollows of the hulls.

The carrier is impregnated with a reagent having the property of reacting with the impurity to be removed from the air. For example, for removing ammonia from ammonia-laden air to render it fit for breathing, a substantially saturated water solution of nickel nitrate is particularly effective. Nickel chloride may be used effectively in the same way. The chlorides and sulphates, of cobalt, copper, zinc, iron, and other metallic salts having an affinity for ammonia may be similarly used if desired.

The reaction of such salts with ammonia is most rapid and effective when the salt is in solution so as to permit an ionic dissociation of the salt. It is therefore preferred to use such salts in the form of a saturated or nearly saturated water solution of the salt. The solution retains its reactive properties when mixed with the carrier as a paste sufficiently thick to prevent it from flowing out of the rice hulls. In general, the salts of high solubility in water, and strong affinity for ammonia are most desirable, the carrier being substantially saturated with the solution so as to expose air passing through the canister to direct contact with the salt solution over a large area.

For practical commercial purposes, a canister for the removal of ammonia from air must pass certain tests, and comply with certain rigid requirements. Among such tests, air at a temperature within the range of 22° to 26° C., and of 25 percent relative humidity, is passed through the canister at the rate of 64 liters per minute for a period totaling 6 hours. The canister is then placed in an upright position, and kept at a temperature within the limits 22°–26° for a period not to exceed 18 hours. Air containing 2 percent by volume of ammonia is then passed through the container at the rate of 32 liters per minute, continuous flow, the temperature being approximately 25° C., and the relative humidity 50 percent. To be approved, the canister must have a life or service time of at least 10 minutes, the end of the life being at the time at which the air after passing through the canister contains 0.01% by volume of ammonium.

The preliminary treatment prescribed by the above described test is such that the water solvent for the active agent is evaporated and carried away to such an extent that the operating efficiency is greatly impaired, and in a canister of practicable size the effective life may be reduced below the required minimum.

By my present invention I have overcome the difficulty by incorporating with the filler a substance capable of retarding the evaporation of the water solvent. For that purpose I have found that the addition to the water solution of the active reagent, of a water soluble organic liquid having a high boiling point and low vapor pressure, will prevent excessive evaporation of water from the solution without impairing the chemical action of the reagent. Diethylene glycol monobutyl ether (known commercially as "butyl carbitol") is well suited for the purpose, and is preferred in my present practice.

Other high boiling point alcohol ethers of the same general class may be similarly used as for example: ethylene glycol monobutyl ether, diethylene glycol monoethyl ether, diethylene glycol monomethyl ether, or ethylene glycol monomethyl ether. The glycols having high boiling point and low vapor pressures, as for example diethylene glycol, or the ethylene, propylene, or triethylene glycols may be used. The high boiling point amines, such as diethanolamine, monoethanolamine or triethanolamine may be similarly used, but are not especially desirable in an ammonia canister because of the slight ammonia-like odor which they have. Butyric acid, and similar substances are objectionable because of their unpleasant odors, but otherwise may be used.

Diethylene glycol monoethyl ether acetate, and other similar organic liquids of high boiling point and low vapor pressure may also be used. The primary requisite is that the retarding agent be soluble in water without reaction with the active purifying agent, and that it have a high boiling point, preferably above approximately 150° C. and a low vapor pressure preferably below approximately 3. Most of the materials included in the above examples have a vapor pressure less than 0.01.

Since, in service, the air passing through the canister is breathed immediately after leaving the canister, the organic liquid used as an evaporation retarding agent should not have an objectionable odor or produce harmful vapors; and some of the organic liquids which would otherwise be available for such use are impracticable for that reason. A layer of charcoal laid over the reactive filler will in most cases effectually absorb the odor and vapors from most of the organic liquids contemplated by my invention; and I prefer to apply a layer 7 of charcoal or equivalent material above the active layer 6 in the canister.

As illustrative of the preferred practice of my invention a filler for a small type canister comprises the following:

Active layer:

| | Grams |
|---|---|
| Rice hulls | 72½ |
| Rice hull ash | 72½ |
| Nickel nitrate solution | 158½ |
| Diethylene glycol monobutyl ether | 32 |

Top layer:

| | Grams |
|---|---|
| Charcoal | 50 |

The nickel nitrate solution is preferably prepared by dissolving 3 parts of the salt in 1 part of water. If desired, the mixture may be heated to lessen the time required to bring the salt into solution, it being possible to bring the solution to a boil without affecting the final result. Additional water is added to replace any lost by evaporation. The organic liquid may be added to the nickel salt solution either before or after the salt has become completely dissolved. The rice hulls and rice hull ash are introduced into the mixture, and the mixture is then vigorously rolled until the liquid is absorbed by the ash to form a wet paste which becomes packed in the cup-like hollows of the rice hulls. I find that better results are obtained by introducing the hulls and ash into the solution at the same time than when the ash is introduced after the hulls have been wetted.

The mixture is then packed with light pressure in the canister. The layer 6, is supported by a screen 8 arched over the intake valve 3. The charcoal is then placed in a layer 7 above the active filler, and over the charcoal is placed a layer of gauze 9 and a top screen 10. A spring 11, compressed by the canister cover 12, holds the filler under light pressure.

The filler so prepared and packed in a canister has been found to have a period of useful life materially exceeding commercial requirements, and also exceeding the useful life of canister fillers of the type heretofore known.

The amounts of the various materials may of course be varied through a wide range, and equivalent materials may be substituted if desired, in accordance with varying requirements.

The amount of nickel nitrate, or equivalent active agent, may be varied through a considerable range. Where only a short period of active life is required, or the concentration of the impurity to be removed is very low, the amount of the active agent may be reduced to as low as about 50 grams. For a longer period of useful life, the quantity of active reagent should be increased; and as much as about 200 grams may be used in the filler of the size above contemplated, if desired. The quantity of solvent may be similarly varied, but should be sufficient to insure substantially complete solution of the active agent. The amount of evaporation retarding agent may vary from about 50% to 150% of the amount of solvent used. The quantity of rice hulls and pulverulent material should be of course increased or decreased in proportion to the amount of liquid so as to obtain a paste which will substantially fill, and be retained by, the rice hulls. An excess of liquid will permit the paste to flow out of the hulls and collect as a dense mass which will preclude free passage of air through the canister; and an excess of pulverulent material or rice hulls unnecessarily increases the bulk of the filler.

While I have described only a filler primarily intended for removing ammonia from air, other impurities may be removed by the use of a chemical reagent having an affinity for the particular impurity to be removed. The chemical properties of such reagents are well known to chemists and such substitution can be readily made by those skilled in the art.

I claim:

1. A filler for gas mask canisters comprising grain hulls having pulverulent material deposited in the hollows thereof, the pulverulent material being moistened with a water solution of a nickel salt and a liquid of high boiling point and low vapor pressure for retarding the evaporation of the water without materially affecting the reaction of the salt upon an impurity to be removed from air passed through the filler.

2. A filler for gas mask canisters comprising grain hulls having pulverulent material deposited in the hollows thereof, the pulverulent material being wet with a water solution of a chemical having an affinity for ammonia, and containing a water soluble organic liquid selected from the group consisting of the alcohol-ethers, glycols and amines of high boiling point and low vapor pressure for retarding evaporation of the water.

3. A filler for gas mask canisters comprising grain hulls having pulverulent material deposited in the hollows thereof, the pulverulent material being wet with a water solution of a chemical having an affinity for ammonia, and containing a high boiling point alcohol-ether for retarding evaporation of the water.

4. A filler for gas mask canisters comprising grain hulls having pulverulent material deposited in the hollows thereof, the pulverulent material being wet with a water solution of a chemical having an affinity for ammonia, and containing a high boiling point glycol for retarding evaporation of the water.

5. A filler for gas mask canisters comprising a resilient porous absorbent carrier wet with a water solution of a chemical having an affinity for ammonia, and containing a high boiling point amine for retarding evaporation of the water.

6. The method of prolonging the useful life of gas mask canister fillers containing a water solution of a chemical which comprises introducing into the filler solution an organic liquid of high boiling point and low vapor pressure selected from the group consisting of the alcohol-ethers, glycols and amines for retarding the evaporation of the water without materially affecting the chemical activity of the chemical.

7. The method of prolonging the useful life of gas mask canister fillers containing a water solution of a chemical which comprises introducing into the filler solution a high boiling point alcohol-ether for retarding the evaporation of the water without materially affecting the chemical activity of the chemical.

8. The method of prolonging the useful life of gas mask canister fillers containing a water solution of a chemical which comprises introducing into the filler solution a high boiling point glycol for retarding the evaporation of the water without materially affecting the chemical activity of the chemical.

9. The method of prolonging the useful life of gas mask canister fillers containing a water solution of a chemical which comprises introducing into the filler a high boiling point amine for retarding the evaporation of the water without materially affecting the chemical activity of the chemical.

10. A filler for gas mask canisters comprising grain hulls, a pulverulent material wet with a liquid chemical reagent having an affinity for an impurity to be removed from air and containing an organic liquid of high boiling point and low vapor pressure selected from the class consisting of the glycols, amines, and alcohol-ethers for retarding evaporation of the chemical reagent without materially affecting the chemical action of the reagent, the wet material being deposited in the hollows of the grain hulls.

11. A filler for gas mask canisters comprising grain hulls, a pulverulent material wet with a liquid chemical reagent having an affinity for an impurity to be removed from air and containing an organic liquid of high boiling point and low vapor pressure for retarding evaporation of the chemical reagent without materially affecting the chemical action of the reagent, the wet material being deposited in the hollows of the grain hulls.

12. A filler for gas mask canisters comprising a paste containing pulverulent material and a solution of a chemical reagent having an affinity for an impurity in air passed through a canister, an organic liquid of high boiling point and low vapor pressure dissolved in the solution for retarding evaporation of the solvent without materially affecting the chemical reaction of the reagent with the impurity, and a carrier for the paste comprising a multitude of resilient cup-like bodies containing the paste in the hollows of the bodies.

13. A filler for gas mask canisters comprising a paste composed of pulverulent material and a solution of a chemical reagent having an affinity for an impurity in air passed through a canister, an organic liquid selected from the group consisting of the alcohol-ethers, glycols and amines of high boiling point and low vapor pressure dissolved in the solution for retarding evaporation of the solvent, and resilient means for carrying the paste in a multitude of globules spaced to permit the passage of air through the filler in contact with the globules.

14. In a filler for gas mask canisters, the combination of a wet paste held in spaced globules in a canister and containing a chemically active material dissolved in the liquid component of the paste, and an organic substance dissolved in the liquid component, said substance having a high boiling point and low vapor pressure for retarding evaporation of the solvent liquid without materially affecting the chemically active material.

15. In a filler for gas mask canisters, the combination of a wet paste held in spaced globules in a canister and containing a chemically active material dissolved in the liquid component of the paste, and an organic liquid of high boiling point and low vapor pressure selected from the group consisting of the glycols, alcohol-ethers and amines, the organic liquid being dissolved in the liquid component of the paste for retarding evaporation thereof without materially affecting the chemically active material.

16. In a filler for gas mask canisters, the combination of a wet paste held in spaced globules in a canister and containing a chemically active material dissolved in the liquid component of the paste, and a glycol of high boiling point and low vapor pressure dissolved in the liquid component of the paste.

17. In a filler for gas mask canisters, the combination of a wet paste held in spaced globules in a canister and containing a chemically active material dissolved in the liquid component of the paste, and an alcohol-ether of high boiling point and low vapor pressure dissolved in the liquid component of the paste.

CORNELIUS S. FLEMING.